United States Patent [19]

Cavanaugh

[11] 4,099,202
[45] Jul. 4, 1978

[54] MULTIPLEXED COMMUNICATION OF VOICE SIGNALS AND SLOW SCAN TELEVISION SIGNALS OVER A COMMON COMMUNICATION CHANNEL

[75] Inventor: Leo Francis Cavanaugh, Dover, N.H.
[73] Assignee: Robot Research, Inc., San Diego, Calif.
[21] Appl. No.: 792,813
[22] Filed: May 2, 1977
[51] Int. Cl.² .............................................. H04N 7/14
[52] U.S. Cl. .................. 358/85; 179/2 TV; 358/143
[58] Field of Search ............ 179/2 TV, 2 TS; 358/85, 358/142, 146, 143, 145

[56] References Cited

U.S. PATENT DOCUMENTS

| 2,314,471 | 3/1943 | Wright | 358/85 |
| 3,021,384 | 2/1962 | Brown | 179/2 TV |
| 3,352,966 | 11/1967 | Sawazaki et al | 358/85 |
| 3,974,337 | 8/1976 | Tatsuzawa | 179/2 TV |

Primary Examiner—Richard Murray
Assistant Examiner—Joseph A. Orsino, Jr.
Attorney, Agent, or Firm—Brown & Martin

[57] ABSTRACT

A system for transmitting and receiving both a slow scan television signal and a voice signal over a common communication channel is disclosed. The slow scan television signal includes horizontal sync pulses provided at a predetermined rate for defining a predetermined period. The horizontal sync pulse and video information for a video scan line are contained within a first portion of the predetermined duration.

A multiplexing device alternately connects either a video transceiver or an audio transceiver to the communication channel. The multiplexing device connects the video transceiver to the communication channel during the duration of a first multiplexing control signal and during the duration of a second multiplexing control signal.

The first multiplexing control signal is provided in response to the slow scan television signal provided by the video transceiver and has a duration corresponding to the first portion of the predetermined period. The second multiplexing control signal is provided in response to detection of a horizontal sync pulse in a video signal received from the communication channel and has a duration corresponding to the duration of the first multiplexing control signal. The first multiplexing control signal controls the multiplexing device when the video transceiver is in a transmit mode, the second multiplexing control signal controls the multiplexing means when the video transceiver is in a receive mode.

A gap of a predetermined duration is defined in the signals provided by the multiplexing means to the communication channel between each voice signal and each succeeding slow scan television signal.

12 Claims, 11 Drawing Figures

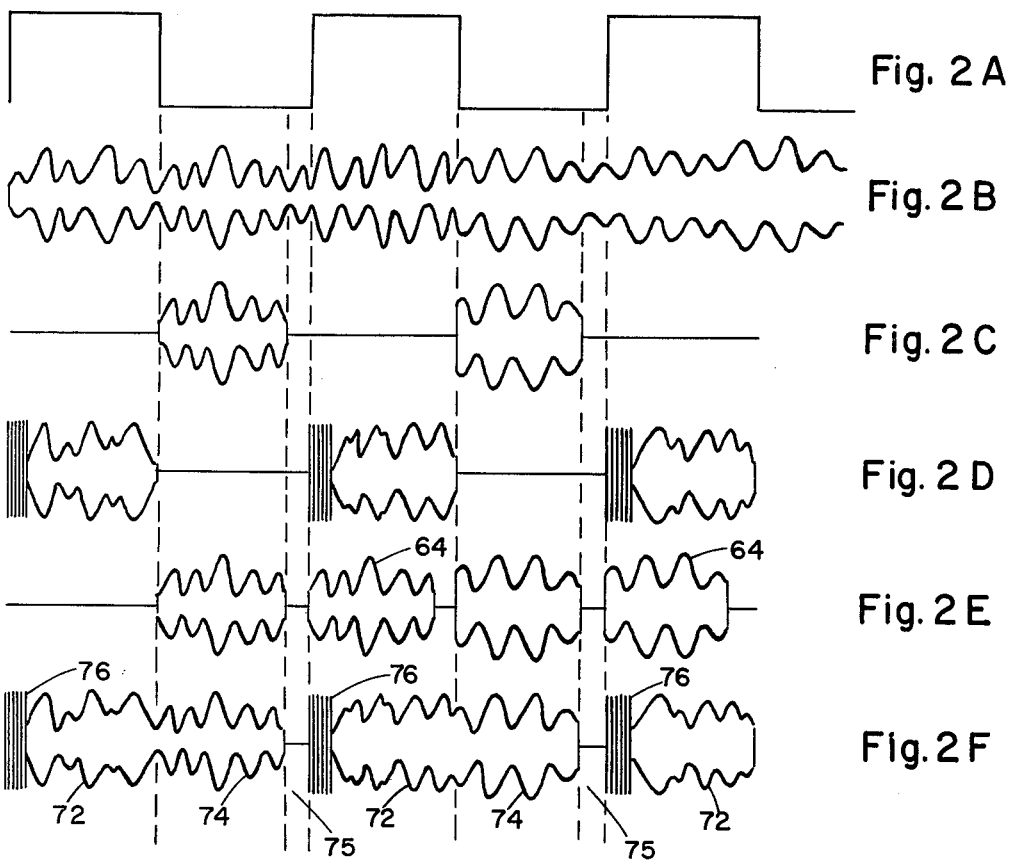
Fig. 2A
Fig. 2B
Fig. 2C
Fig. 2D
Fig. 2E
Fig. 2F
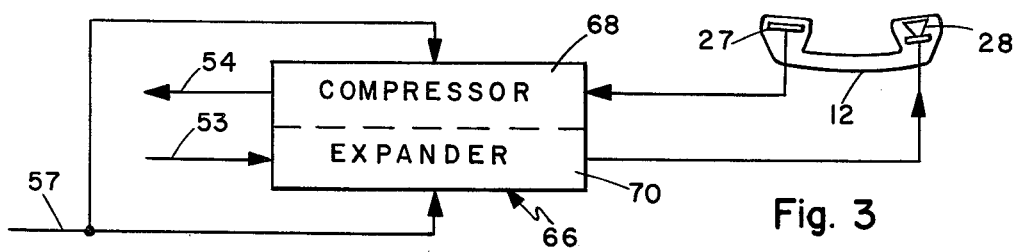
Fig. 3
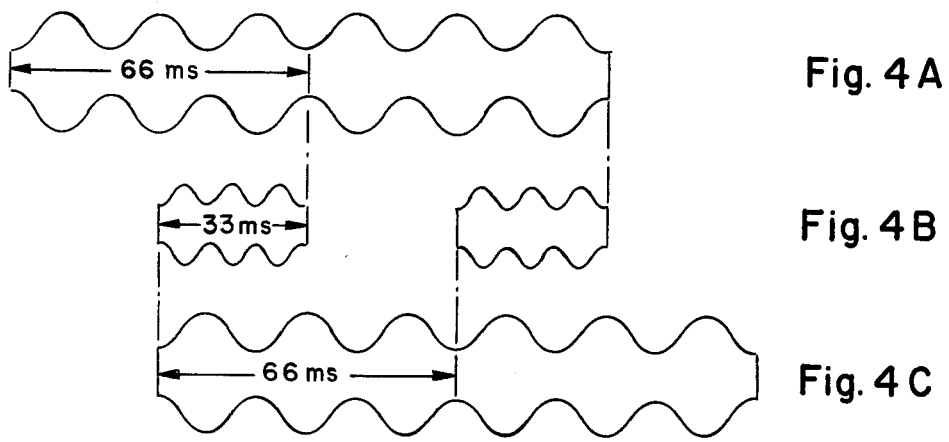
Fig. 4A
Fig. 4B
Fig. 4C

MULTIPLEXED COMMUNICATION OF VOICE SIGNALS AND SLOW SCAN TELEVISION SIGNALS OVER A COMMON COMMUNICATION CHANNEL

BACKGROUND OF THE INVENTION

The present invention generally pertains to slow scan television, and is particularly directed to communications of voice signals and slow scan television signals over a common communication channel.

Slow scan television systems process a video signal to enable video information to be provided and received over a narrow bandwidth voice grade communication channel, such as a telephone circuit. In order for a narrow band communication channel to be able to accomodate video information, the scanning rate of such information must be greatly reduced. Slow scan television signals typically have a scan rate of between approximately 8 and 32 seconds per video frame in order to be able to communicate sufficient video information to be able to provide a video presentation of acceptable quality on a television monitor.

Slow scan television systems are described in a U.S. Patent filed Jan. 7, 1977, by Munsey, entitled "Slow Scan Television Scan Converter", Ser. No. 758,019; now U.S. Pat. No. 4,057,836 and in a publication by Steber "SSTV to Fast Scan Converter" QST, March 1975, pp 33–40 and May 1975, pp 28–46.

In a state of the art slow scan television system, voice signals cannot be communicated over the same communication as the slow scan television signals while slow scan television signals for a given video field defining a complete picture are being communicated from one station to another. As a consequence thereof, either voice communication between the stations is not undertaken during the relatively lengthy intervals while slow scan television signals are being communicated over the communication channel, or a second communication channel is provided between the stations so as to enable voice communication while the slow scan television picture is being communicated.

SUMMARY OF THE INVENTION

The present invention enables voice signals to be communicated over the same communication channel that slow scan television signals are being communicated over, while the slow scan television signals for a given field of video information are being communicated. This result is obtained by multiplexing the voice signal with the slow scan television signal.

The system of the present invention multiplexes the slow scan television signal with the voice signal without losing any of the video information content of the slow scan television signal.

In accordance with the present invention there is provided a system for coupling a video transceiver and an audio transceiver to a common communication channel for transmitting and receiving both a slow scan television signal and a voice signal over the common communication channel. The video transceiver is adapted for providing and receiving a slow scan television signal, wherein the slow scan television signal includes horizontal sync pulses provided at a predetermined rate for defining a predetermined period, and wherein the horizontal sync pulse and video information for a video scan line are contained within a first portion of the predetermined period. The audio transceiver is adapted for providing and receiving a voice signal. A coupling device is connected to the communication channel. A multiplexing device is adapted for alternately connecting either the video transceiver or the audio transceiver to the coupling device. A first signal generator is adapted for providing a first multiplexing control signal in response to the slow scan television signal provided by the video transceiver, wherein the first multiplexing control signal has a duration corresponding to the first portion of the predetermined period. A circuit, such as a sync separator, is adapted for detecting a horizontal sync pulse in a slow scan television signal received by the coupling device from the communication channel. A second signal generator is adapted for providing a second multiplexing control signal in response to such detection of a horizontal sync pulse, wherein the duration of the second multiplexing control signal corresponds to the duration of the first multiplexing control signal. A mode selection device is adapted for placing the video transceiver in either a receive mode for receiving slow scan television signals, and for providing a mode indication signal for indicating which mode the video transceiver is in. A video switching device is connected between the video transceiver and the multiplexing device, and is responsive to the mode indication signal for connecting the video transceiver to receive slow scan television signals from the multiplexing device during the receive mode and to provide slow scan television signals to the multiplexing device during the transmit mode. A control signal source switching device is connected between the multiplexing device and the first and second signal generators, and is responsive to the mode indication signal for providing the first multiplexing control signal to the multiplexing device during the transmit mode, and for providing the second multiplexing control signal to the multiplexing device during the receive mode. The multiplexing device connects the video transceiver to the coupling device during the duration of the first multiplexing control signal and during the duration of the second multiplexing control signal.

Other features of the present invention are described hereinbelow in the Description of the Preferred Embodiments.

BRIEF DESCRIPTION OF THE DRAWING

FIGS. 2A through 2F illustrate waveforms of signals present in various portions of the system shown in FIG. 1.

FIG. 3 is a block diagram showing an alternative embodiment to a portion of the system shown in FIG. 1.

FIGS. 4A through 4C illustrate waveforms of signals provided by the embodiment shown in FIG. 3.

DESCRIPTION OF THE PREFERRED EMBODIMENTS

Figure 1:
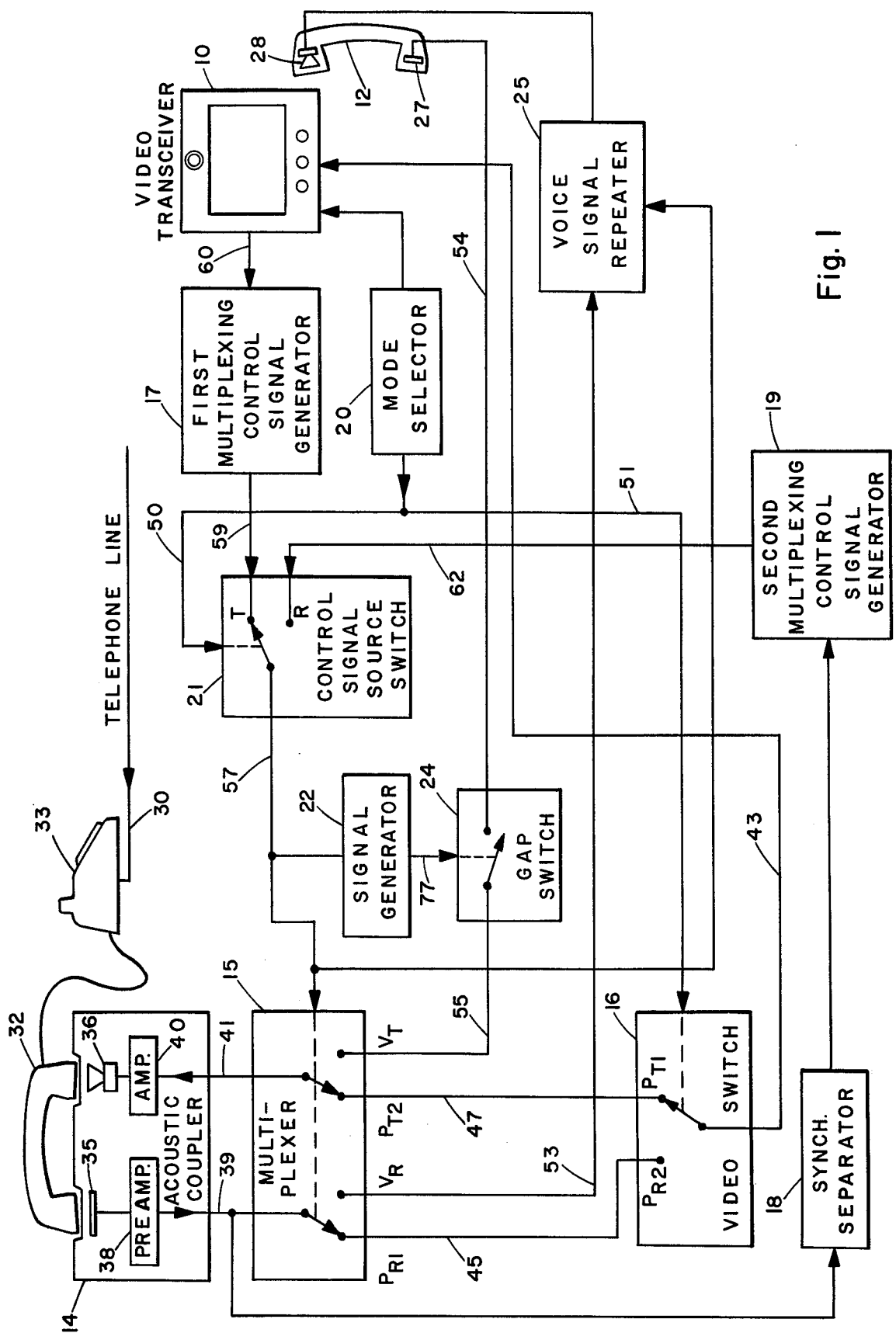
FIG. 1 is a schematic block diagram showing the system of the present invention.

A system for transmitting and receiving both a slow scan television signal and a voice signal over a common communication channel is shown in FIG. 1.

The system includes a video transceiver 10, an audio transceiver 12, an acoustic coupler 14, a multiplexer 15, a video switch 16, a first multiplexing control signal generator 17, a sync separator 18, a second multiplexing control signal generator 19, a mode selection device 20, a control signal source switch 21, a signal generator 22, a gap switch 24 and a voice signal repeater 25.

The video transceiver 10 is of the type described in the aforementioned patent application by Munsey, Ser. No. 758,019, the disclosure of which is incorporated herein by reference thereto. The video transceiver 10 is adapted for providing and receiving a slow scan television signal over a communication channel having a bandwidth of approximately 2500 Hz. The slow scan television signal includes horizontal sync pulses provided at a predetermined rate of approximately 15 per second for defining a predetermined period of approximately 66 msec. The horizontal sync pulse and the video information for a video scan line are contained within an interval of 33 msec., which corresponds to the first half of the predetermined 66 msec. period.

The audio transceiver 12 includes typical telephone handset, including a mouthpiece 27 and an earpiece 28. The audio transceiver 12 is adapted for providing and receiving a voice signal.

The acoustic coupler 14 is adapted for coupling the system of the present invention to a communication channel such as a telephone line 30 through a telephone handset 32 and deskset 33. The acoustic coupler 14 includes a microphone 35, adjacent which the telephone handset 32 earpiece is positioned; and a speaker 36, adjacent which the telephone handset 32 mouthpiece is positioned. The microphone 35 is coupled through a preamplifier circuit 38 to the acoustic coupler output line 39. The speaker 36 is coupled through an amplifier circuit 40 to the acoustic coupler input line 41.

The multiplexer 15 is connected to the acoustic coupler 14 via lines 39 and 41.

The multiplexer 15 is connected to the video transceiver 10 by means of the video switch 16. The video switch 16 is connected to the video transceiver 10 by line 43. Both transmitted and received slow scan television signals are communicated over line 43.

Received slow scan television signals are conveyed over line 45 from terminal $P_{R1}$ of the multiplexer 15 to terminal $P_{R2}$ of the video switch 16. Transmitted slow scan television signals are conveyed over line 47 from terminal $P_{T1}$ of the video switch 16 to terminal $P_{T2}$ of the multiplexer 15. The video switch 16 connects line 43 from the video transceiver 10 to either terminal $P_{R2}$ or terminal $P_{T1}$ in accordance with the mode of operation of the video transceiver 10.

The mode selection device 20 is used for placing the video transceiver 10 in either a "receive" mode for receiving slow scan television signals, or in a "transmit" mode for providing slow scan television signals. The mode selection device 20 also provides a mode indication signal on lines 50 and 51 indicating which mode the video transceiver 10 is in.

The video switch 16 responds to the mode indication signal on line 51 by connecting line 43 to terminal $P_{R2}$ during the receive mode so that the video transceiver 10 can receive slow scan television signals from the multiplexer 15; and by connecting line 43 to terminal $P_{T1}$ during the transmit mode; so that the video transceiver 10 can provide slow scan television signals to the multiplexer 15.

The multiplexer 15 is also connected to the audio transceiver 12. Received voice signals are conveyed over line 53 from terminal $V_R$ of the multiplexer 15 through the voice repeater 25 to the earpiece 28 of the audio transceiver 12. Transmitted voice signals are conveyed over line 54 from the mouthpiece of the audio transceiver 12, through the gap switch 24 and over line 55 to terminal $V_T$ of the multiplexer 15.

The multiplexer 15 connects the video transceiver 10 to the telephone line 30 by connecting lines 39 and 41 to terminals $P_{R1}$ and $P_{T2}$ respectively in response to the receipt of a multiplexing control signal on line 57.

A first multiplexing control signal is provided by the first multiplexing signal generator 17 when the video transceiver 10 is in a transmit mode. A second multiplexing control signal is provided by the second multiplexing control signal generator 19 when the video transceiver is in the receive mode.

The first multiplexing control signal generator 17 provides the first multiplexing control signal on line 59 in response to the slow scan television signal provided on line 60 by the video transceiver 10. The first multiplexing control signal has a duration of 33 msec. thereby corresponding to the first portion of the predetermined period, in which the horizontal sync pulse and the video information for a video scan line are contained. The waveform of the first multiplexing control signal is illustrated in FIG. 2A.

The sync separator 18 is adapted for detecting a horizontal sync pulse in a slow scan television signal on line 39 received by the acoustic coupler 14 from the telephone line 30. The second multiplexing control signal generator 19 provides a second multiplexing control signal on line 62 in response to such detection of a horizontal sync pulse by the sync separator 18. The duration of the second multiplexing control signal on line 62 corresponds to the duration of the first multiplexing control signal on line 59. Both control signals have the waveform shown in FIG. 2A.

The first and second multiplexing control signal generators 17 and 19 each include a one shot multivibrator circuit which responds to the leading edge of the horizontal sync pulse to provide a multiplexing control signal pulse having a duration of 33 msec.

The first and second multiplexing control signals on lines 59 and 62 respectively are provided to the multiplexer 15 via line 57 by means of the control signal source switch 21. Line 59 is connected to terminal T of the source switch 21; and line 62 is connected to terminal R of the source switch 21. Source switch 21 is positioned in accordance with the state of the mode indication signal on line 50 from the mode selection device 20.

The control signal source switch 21 responds to the mode indication signal on line 50 to connect line 57 to the terminal T during the transmit mode, and to connect line 57 to the terminal R during the receive mode. Accordingly the first multiplexing control signal is provided to the multiplexer 15 during the transmit mode, and the second multiplexing control signal is provided to the multiplexer 15 during the receive mode.

Thus, the multiplexer 15 connects the video transceiver 10 to the telephone line 30 during the 33 msec. duration of the first multiplexing control signal on line 59, and during the 33 msec. duration of the second multiplexing control signal on line 62.

In the absence of a control signal pulse on line 57 the multiplexer 15 connects the audio transceiver 12 to the telephone line 30 by connecting lines 39 and 41 to terminals $V_R$ and $V_T$ respectively. Because the multiplexing control signals have a duration of only 33 msec. out of a total predetermined period between the horizontal sync pulses of 66 msec., the duration over which the multiplexer connects terminals $V_R$ and $V_T$ to lines 39 and 41 also is 33 msec. Thus the multiplexer alternately connects either the video transceiver 10 or the audio transceiver 12 to the acoustic coupler 14 and thereby to the telephone line 30 for 33 msec. intervals.

The waveform of the voice signal provided by the audio transceiver 12 on line 54 is illustrated in FIG. 2B. The waveform of the voice signal provided on line 41 from the multiplexer 15 to the acoustic coupler 14 is illustrated in FIG. 2C.

Although approximately half of the voice signal is lost, the communicated voice signal is of essentially the same intellegibility to a listener due to redundancy of speech phonemes. None of the video information is lost since it is provided only during the first 33 msec. portion of the predetermined 66 msec. period while the multiplexer 15 connects the video transceiver 10 to the acoustic coupler 14. The waveform of the slow scan television signal provided on line 41 from the multiplexer 15 to the acoustic coupler 14 is illustrated in FIG. 2D.

It is desirable to fill the gaps in the communicated voice signal during those periods when a video signal is being communicated.

In one preferred embodiment, as shown in FIG. 1, a voice signal repeater 25 is connected between the multiplexer 15 and the audio transceiver 12. The voice signal repeater 25 passes the received voice signal to the audio transceiver 12. The voice signal repeater 25 is further connected to the source switch 21 for detecting the first and second multiplexing control signals on line 57. The voice signal repeater 25 repeats the received voice signal for passage to the audio transceiver 12 whenever a multiplexing control signal is detected on line 57 following receipt of the received voice signal on line 53 from the multiplexer 15. FIG. 2E illustrates the waveform of a voice signal received by the audio transceiver 12 from the voice signal repeater 25 that includes repeated segments 64 of the voice signal received from the multiplexer 15.

In an alternative preferred embodiment, wherein the communication channel bandwidth is twice that needed for voice communications or greater, such as an FM broadcast station's sub carrier (commonly used for transmitting continuous music to stores), an AM short wave broadcast station channel or an audio tape recorder channel, the voice signal can be communicated without deletion of alternate 33 msec. time segments by electronically time compressing consecutive 66 msec. periods of the voice signal into 33 msec. time segments for insertion between the slow scan television signal segments of equal duration.

In accordance with this alternative embodiment, a compressor/expander device 66 (shown in FIG. 3) is substituted for the voice signal repeater 25 shown in FIG. 1. The compressor/expander device 66 includes a compressor 68 connected to the speaker 27 of the audio transceiver 12 and to the multiplexer 15 via the line 54. The device 66 also includes an expander 70 connected to the earphone 28 of the audio transceiver 12 and to the multiplexer 15 via the line 53.

The compressor 68 and expander 70 are both connected to the control signal source switch 21 via line 57, and are controlled by the first and second multiplexing control signals provided on lines 59 and 62 respectively.

The compressor compresses the voice signal provided from the audio transceiver 12 during the predetermined 66 msec. period whenever the control signal is provided on line 57 so that the compressed voice signal is provided to the multiplexer 15 during the 33 msec. interval between successive control signals.

The waveform of the voice signal provided from the audio transceiver 12 is illustrated in FIG. 4A and the waveform of the voice signal provided by the compressor 68 to the multiplexer 15 is illustrated in FIG. 4B.

The expander 70 expands the compressed voice signal received from the multiplex 15 during the predetermined 66 msec. period whenever the control signal is provided on line 57 so that the expanded voice signal is provided to the audio transceiver 12 over a 66 msec. interval. The expanded voice signal has the same frequency spectrum as an originally provided voice signal and therefore it is continuous and intelligible.

The time relationship between the compressed voice signal received from the multiplexer 15 and the expanded voice signal provided by the expander 70 to the audio transceiver 12 is illustrated by FIG. 4B showing the waveform of the compressed voice signal and FIG. 4C showing the waveform of the expanded signal.

FIG. 2F illustrates the waveform of the multiplexed signal provided by the multiplexer 15 on line 41 to the acoustic coupler 14. The multiplexed signal includes slow scan television signal segments 72 and voice signal segments 74.

There is a gap 75 of approximately 2 msec. in the multiplexed signal provided on line 41 between the end of each voice signal 74 and the beginning of each succeeding slow scan television signal 72. This gap 75 allows the horizontal sync pulse 76 to be more easier detected at the station where the multiplexed signal provided on line 41 and communicated over telephone line 30 is received. This gap 75 also provides a transition between successive voice signals when the voice signal received on line 53 from the multiplexer 15 is repeated, such as is shown in FIG. 2E.

This 2 msec. gap 75 is provided by the combination of the signal generator 22 and the gap switch 24. The signal generator 22 is connected to the control signal source switch 21 and provides a voice transmission inhibiting signal on line 77 in response to either the first multiplexing control signal being provided on line 59 or the second multiplexing control signal being provided on line 62. The inhibiting signal on line 77 commences at a time which is 31 msec. beyond the duration of the 33 msec. control signal on line 57 and therefore is 2 msec. before the next horizontal sync pulse 76. The duration of the inhibiting signal on line 77 is approximately 2 msec. The signal generator 22 includes a one shot multivibrator.

The gap switch 24 responds to the inhibiting signal on line 77 by inhibiting the voice signal provided by the audio transceiver 12 on line 54 from being provided to the multiplexer 15.

When no slow scan television signals are being transmitted or received by the video transceiver 10, no multiplexing control signals are provided on lines 57 and 62, and the multiplexer maintains the terminals $V_R$ and $V_T$ in continuous connection with lines 39 and 41 respectively so as to enable continuous voice signal communication over the telephone line 30 to and from the audio transceiver 12.

Having described my invention, I now claim:

1. A system for coupling a video transceiver and an audio transceiver to a common communication channel for transmitting and receiving both a slow scan television signal and a voice signal over said common communication channel, wherein said slow scan television signal includes a horizontal sync pulses provided at a predetermined rate for defining a predetermined period and wherein said horizontal sync pulse and video information for a video scan line are contained within a first portion of said predetermined period, comprising coupling means for connection to said communication channel;

multiplexng means for alternately connecting either said video transceiver or said audio transceiver to the coupling means;

means for providing a first multiplexing control signal in response to said slow scan television signal provided by said video transceiver, wherein said first multiplexing control signal has a duration corresponding to said first portion of said predetermined period;

means for detecting a horizontal sync pulse in a slow scan television signal received by the coupling means from said communication channel;

means for providing a second multiplexing control signal in response to said detector of said horizontal sync pulse, wherein the duration of said second multiplexing control signal corresponds to the duration of said first multiplexing control signal;

means for placing said video transceiver in either a receive mode for receiving slow scan television signals, or in a transmit mode for providing slow scan television signals, and for providing a mode indication signal for indicating which mode said video transceiver is in;

video switching means for connection between the said video transceiver and the multiplexing means, and responsive to said mode indication signal for connecting said video transceiver to receive slow scan television signals from the multiplexing means during said receive mode and to provide slow scan television signals to the multiplexing means during said transmit mode;

control signal source switching means connected between the multiplexing means and the means for providing said first and second multiplexing control signals, and responsive to said mode indication signal for providing said first multiplexing control signal to the multiplexing means during said transmit mode, and for providing said second multiplexing control signal to the multiplexing means during said receive mode;

wherein the multiplexing means connects said video transceiver to the coupling means during the duration of said first multiplexing control signal and during the duration of said multiplexing control signal.

2. A system according to claim 1, further comprising means for providing a voice transmission inhibiting signal whenever either said first multiplexing control signal or said second multiplexing control signal is provided, wherein said inhibiting signal commences at a time which is a first predetermined duration beyond the duration of said control signal and a second predetermined duration before the next horizontal sync pulse; and means responsive to said inhibiting signal for inhibiting said voice signal provided by said audio transceiver from being provided to the multiplexing means;

whereby a gap of said second predetermined duration is defined in said signals provided by the multiplexing means to the coupling means between each voice signal and each succeeding slow scan television signal.

3. A system according to claim 2, further comprising means connected between the multiplexing means and said audio transceiver for passing a rceived voice signal to said audio transceiver, and further connected for detecting said first and second multiplexing control signals, and for repeating said received voice signal for passage to said audio transceiver whenever a multiplexing control signal is detected following receipt of said received voice signal from the multiplexing means.

4. A system according to claim 2, further comprising means connected between said audio transceiver and the multiplexing means and responsive to said multiplexing control signal for compressing said voice signal provided from said audio transceiver during said predetermined period whenever said control signal is provided so that said compressed voice signal is provided to the multiplexing means during the interval between successive control signals, and for expanding a compressed voice signal received from the multiplexing means during said predetermined period whenever said control signal is provided so that said expanded voice signal is provided to said audio transceiver over an interval having a duration corresponding to the duration of said predetermined period.

5. A system according to claim 1, further comprising means connected between the multiplexing means and said audio transceiver for passing a received voice signal to said audio transceiver, and further connected for detecting said first and second multiplexing control signals, and for repeating said received voice signal for passage to said audio transceiver whenever no multiplexing control signal is detected following receipt of said received voice signal from the multiplexing means.

6. A system according to claim 1, further comprising means connected between said audio transceiver and the multiplexing means and responsive to said multiplexing control signal for compressing said voice signal provided from said audio transceiver during said predetermined period whenever said control signal is provided so that said compressed voice signal is provided to the multiplexing means during the interval between successive control signals, and for expanding a compressed voice signal received from the multiplexing means during said predetermined period whenever said control signal is provided so that said expanded voice signal is provided to said audio transceiver over an interval having a duration corresponding to the duration of said predetermined period.

7. A system for transmitting and receiving both a slow scan television signal and a voice signal over a common communication channel, comprising a video transceiver for providing and receiving a slow scan television signal, wherein said slow scan television signal includes horizontal sync pules provided at a predetermined rate for defining a predetermined period, and wherein said horizontal sync pulse and video information for a video scan line are contained within a first portion of said predetermined period, an audio transceiver for providing and receiving a voice signal;

coupling means for connection to said communication channel;

multiplexing means for alternately connecting either the video transceiver or the audio transceiver to the coupling means;

means for providing a first multiplexing control signal in response to said slow scan television signal provided by the video transceiver, wherein said first multiplexing control signal has a duration corresponding to said first portion of said predetermined period;

means for detecting a horizontal sync pulse in a slow scan television signal received by the coupling means from said communication channel;

means for providing a second multiplexing control signal in response to said detection of said horizontal sync pulse, wherein the duration of said second multiplexing control signal corresponds to the duration of said first multiplexing control signal;

means for placing the video transceiver in either a receive mode for receiving slow scan television signals, or in a transmit mode for providing slow scan television signals, and for providing a mode indication signal for indicating which mode the video transceiver is in;

video switching means connected between the video transceiver and the multiplexing means, and responsive to said mode indication signal for connecting the video transceiver to receive slow scan television signals from the multiplexing means during said receive mode, and to provide slow scan television signals to the multiplexing means during said transmit mode;

control signal source switching means connected between the multiplexing means and the means for providing said first and second multiplexing control signals, and responsive to said mode indication signal for providing said first multiplexing control signal to the multiplexing means during said transmit mode, and for providing said second multiplexing control signal to the multiplexing means during said receive mode;

wherein the multiplexing means connects the video transceiver to the coupling means during the duration of said first multiplexing control signal and during the duration of said second multiplexing control signal.

8. A system according to claim 7, further comprising means for providing a voice transmission inhibiting signal whenever either said first multiplexing control signal or said second multiplexing control signal is provided, wherein said inhibiting signal commences at a time which is a first predetermined duration beyond the duration of said control signal and a second predetermined duration before the next horizontal sync pulse; and means responsive to said inhibiting signal for inhibiting said voice signal provided by the audio transceiver from being provided to the multiplexing means;

whereby a gap of said second predetermined duration is defined in said signals provided by the multiplexing means to the coupling means between each voice signal and each succeeding slow scan television signal.

9. A system according to claim 8, further comprising means connected between the multiplexing means and the audio transceiver for passing a received voice signal to the audio transceiver, and further connected for detecting said first and second multiplexing control signals, and for repeating said received voice signal for passage to the audio transceiver whenever a multiplexing control signal is detected following receipt of said received voice signal from the multiplexing means.

10. A system according to claim 8, further comprising means connected between the audio transceiver and the multiplexing means and responsive to said multiplexing control signal for compressing said voice signal provided from the audio transceiver during said predetermined period whenever said control signal is provides so that said compressed voice signal is provided to the multiplexing means during the interval between successive control signals, and for expanding a compressed voice signal received from the multiplexing means during said predetermined period whenever said control signal is provided so that said expanded voice signal is provided to the audio transceiver over an interval having a duration corresponding to the duration of said predetermined period.

11. A system according to claim 7, further comprising means connected between the multiplexing means and the audio transceiver for passing a received voice signal to the audio transceiver, and further connected for detecting said first and second multiplexing control signals, and for repeating said received voice signal for passage to the audio transceiver whenever no multiplexing control signal is detected following receipt of said received voice signal from the multiplexing means.

12. A system according to claim 7, further comprising means connected between the audio transceiver and the multiplexing means and responsive to said multiplexing control signal for compressing said voice signal provided from the audio transceiver during said predetermined period whenever said control signal is provided so that said compressed voice signal is provided to the multiplexing means during the interval between successive control signals, and for expanding a compressed voice signal received from the multiplexing means during said predetermined period whenever said control signal is provided so that said expanded voice signal is provided to the audio transceiver over an interval having a duration corresponding to the duration of said predetermined period.

* * * * *